(12) United States Patent
Takebayashi

(10) Patent No.: US 11,642,980 B2
(45) Date of Patent: May 9, 2023

(54) SYSTEM AND METHOD OF NOTIFYING VEHICLE OCCUPANT OF REPLENISHING PLACE CORRESPONDING TO RELATED FACILITY

(71) Applicant: HONDA MOTOR CO., LTD., Tokyo (JP)

(72) Inventor: Ryo Takebayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1100 days.

(21) Appl. No.: 16/292,728

(22) Filed: Mar. 5, 2019

(65) Prior Publication Data

US 2019/0283623 A1    Sep. 19, 2019

(30) Foreign Application Priority Data

Mar. 19, 2018 (JP) .............................. JP2018-051143

(51) Int. Cl.
| | | |
|---|---|---|
| *G01C 21/34* | (2006.01) | |
| *B60L 58/12* | (2019.01) | |
| *B60R 21/015* | (2006.01) | |
| *B60L 3/12* | (2006.01) | |

(52) U.S. Cl.
CPC ................ *B60L 58/12* (2019.02); *B60L 3/12* (2013.01); *B60R 21/01512* (2014.10); *G01C 21/3469* (2013.01); *G01C 21/3476* (2013.01)

(58) Field of Classification Search
CPC ...... B60L 58/12; B60L 3/12; B60R 21/01512; G01C 21/3469; G01C 21/3476
USPC ........................................................ 701/22
See application file for complete search history.

(56) References Cited

U.S. PATENT DOCUMENTS

| | | | | |
|---|---|---|---|---|
| 6,427,118 B1* | 7/2002 | Suzuki | ............. | G08G 1/096866 701/410 |
| 6,622,083 B1* | 9/2003 | Knockeart | ......... | G01C 21/3679 701/428 |
| 7,339,496 B2* | 3/2008 | Endo | ...................... | G01C 21/32 340/995.14 |
| 10,787,095 B2* | 9/2020 | Milding | ............. | G01C 21/3469 |
| 2006/0173841 A1* | 8/2006 | Bill | .................... | G01C 21/3492 |
| 2011/0313657 A1* | 12/2011 | Myllymaki | ........ | G01C 21/3682 701/438 |

(Continued)

FOREIGN PATENT DOCUMENTS

| | | | | |
|---|---|---|---|---|
| EP | | 3485228 B1 * | 12/2020 | ......... G01C 21/3476 |
| JP | | 2008-032569 A | 2/2008 | |

(Continued)

OTHER PUBLICATIONS

Office Action dated Sep. 24, 2021, issued in counterpart JP Application No. 2018-051143, with Partial English translation. (4 pages).

*Primary Examiner* — Richard A Goldman
(74) *Attorney, Agent, or Firm* — WHDA, LLP

(57) ABSTRACT

An obtaining unit obtains attribute information of an occupant of a vehicle, and an extraction unit extracts related facilities having predetermined relations to replenishing places for replenishing driving energy of the vehicle. A notification unit notifies the occupant of a replenishing place corresponding to a predetermined related facility among the related facilities extracted by the extraction unit, which is associated with the attribute information of the occupant obtained by the obtaining unit.

13 Claims, 10 Drawing Sheets

(56) References Cited

U.S. PATENT DOCUMENTS

| | | | | |
|---|---|---|---|---|
| 2012/0187916 A1* | 7/2012 | Duer | | B60L 58/13 |
| | | | | 320/136 |
| 2012/0197696 A1* | 8/2012 | Beyeler | | G01C 21/34 |
| | | | | 705/14.4 |
| 2013/0218458 A1* | 8/2013 | Scholl | | G01C 21/32 |
| | | | | 701/461 |
| 2014/0032678 A1* | 1/2014 | Koukoumidis | | G06Q 30/0255 |
| | | | | 709/205 |
| 2014/0310739 A1* | 10/2014 | Ricci | | G06Q 20/321 |
| | | | | 725/75 |
| 2015/0106001 A1* | 4/2015 | Lee | | G01C 21/3626 |
| | | | | 701/123 |
| 2015/0345978 A1* | 12/2015 | Igelman | | G01C 21/3605 |
| | | | | 701/425 |
| 2015/0356083 A1* | 12/2015 | Gyongyi | | G06F 16/29 |
| | | | | 707/748 |
| 2016/0033293 A1* | 2/2016 | Nobrega | | G01C 21/3461 |
| | | | | 701/428 |
| 2017/0148113 A1* | 5/2017 | Yasko | | G06Q 40/04 |
| 2018/0286236 A1* | 10/2018 | Mazzola | | G08G 1/096838 |
| 2019/0263290 A1* | 8/2019 | Monahan | | B60L 58/14 |
| 2020/0211043 A1* | 7/2020 | Hori | | G06Q 30/0206 |
| 2020/0326196 A1* | 10/2020 | Fujiwara | | B60L 55/00 |
| 2021/0046839 A1* | 2/2021 | Logvinov | | H02J 7/00711 |
| 2021/0065073 A1* | 3/2021 | Maeda | | H04L 67/52 |
| 2021/0183175 A1* | 6/2021 | Dunger | | G06F 21/6245 |
| 2021/0213844 A1* | 7/2021 | Singuru | | H02J 7/00034 |
| 2021/0310819 A1* | 10/2021 | Zhang | | B60L 53/63 |
| 2022/0089056 A1* | 3/2022 | Rajmohan | | B60L 53/66 |

FOREIGN PATENT DOCUMENTS

| | | |
|---|---|---|
| JP | 2012-182872 A | 9/2012 |
| JP | 2013-170932 A | 9/2013 |

\* cited by examiner

FIG. 7

| Occupant Attributes | Charging Spots | Estimated Charging Time | Distance from Current Position | Time, Weather | Surrounding Facilities | | | |
|---|---|---|---|---|---|---|---|---|
| | | | | | Surrounding Facilities | Distance from Charging Spot | Average Stay Time | Attributes (Features) |
| • Family • Three persons | AA Charging Stand | 30MIN | 1.5km | Night-time, Rain | A Racetrack | 100m | 1H | (Acquaintances/Friends, Unaccompanied, Gamble, Horse Racing, For Adults) |
| | | | | | A Pinball Saloon | 30m | 1H | (Unaccompanied, Gamble, Pinball, For Adults) |
| • 30-year-old male • Japanese cuisine lover | BB Charging Stand | 30MIN | 2km | Night-time, Rain | BA Restaurant | 500m | 30MIN | (Unaccompanied, For Family, For Acquaintances/Friends, Kids Allowed, Barrier Free, Chinese Cuisine) |
| | | | | | BB Restaurant | 30m | 45MIN | (For Couples, For Adults, French Cuisine) |
| • 20-year-old female • 2-year-old male | CC Charging Stand | 30MIN | 3km | Night-time, Rain | C Restaurant | 30m | 30MIN | (Unaccompanied, For Family, For Acquaintances/Friends, Kids Allowed, Barrier Free, Japanese Cuisine) |

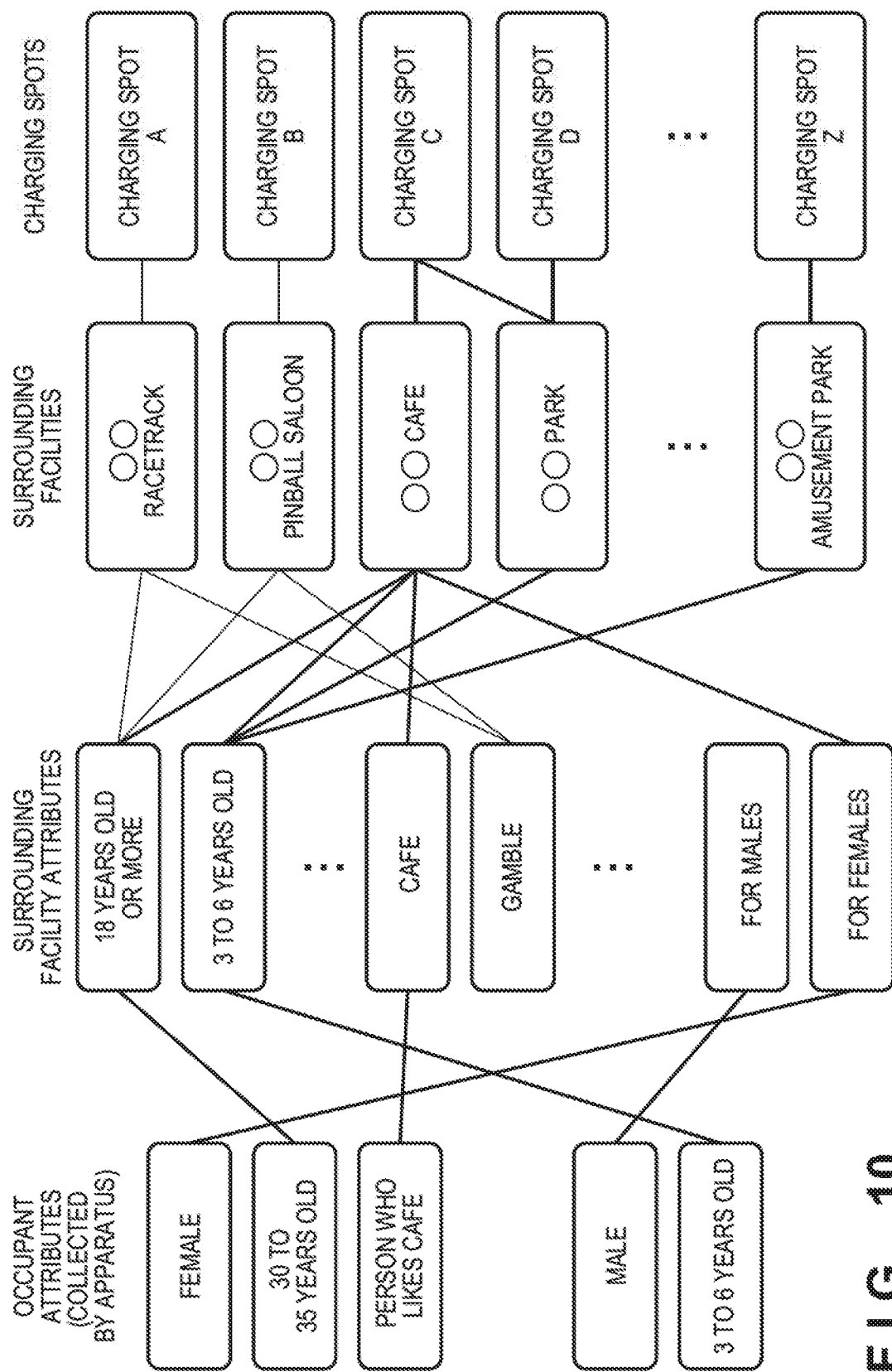
F I G. 10

SYSTEM AND METHOD OF NOTIFYING VEHICLE OCCUPANT OF REPLENISHING PLACE CORRESPONDING TO RELATED FACILITY

CROSS-REFERENCE TO RELATED APPLICATION(S)

This application claims priority to and the benefit of Japanese Patent Application No. 2018-051143 filed on Mar. 19, 2018, the entire disclosure of which is incorporated herein by reference.

BACKGROUND OF THE INVENTION

Field of the Invention

The present invention relates to a notification system and a notification method for making notifications of candidates for a vehicle driving energy replenishing place, and a non-transitory computer-readable storage medium storing a program.

Description of the Related Art

Recently, charging spots for charging electric vehicles such as a plug-in hybrid car incorporating a chargeable battery and mobile apparatuses such as a portable terminal are spreading. As the charging spots spread demand has arisen for a method capable of finding a charging spot more convenient for a user.

Japanese Patent Laid-Open No. 2012-182872 describes a method of extracting information of facilities such as stores which exist around a charging facility and allow a user of the charging facility to go and return based on a necessary charging time. In Japanese Patent Laid-Open No. 2012-182872, a distance which corresponds to the necessary charging time of a vehicle and at which the user can go and return is displayed as a circle, and marks indicating extracted facilities are displayed inside and, outside the circle.

In Japanese Patent Laid-Open No. 2012-182872, information on the facilities is extracted based on the necessary charging time. However. Japanese Patent Laid-Open No. 2012-182872 does not refer to extraction of the facility information based on attribute information of the user. Therefore, when one of the occupants of an electric vehicle is a child, because facilities for children do not always exist around a charging spot for charging the battery, the child may spend a boring time while the battery is charged.

SUMMARY OF THE INVENTION

An aspect of the present invention is to eliminate the above-mentioned problems with the conventional technology. The present invention provides a notification system and notification method which notify an occupant of an appropriate replenishing place based on attribute information of the occupant, and a non-transitory computer-readable storage medium storing a program.

The present invention in its first aspect provides a notification system comprising: an obtaining unit configured to obtain attribute information of an occupant of a vehicle; an extraction unit configured to extract related facilities having predetermined relations to replenishing places for replenishing driving energy of the vehicle; and a notification unit configured to notify the occupant of a replenishing place corresponding to a predetermined related facility, among the related facilities extracted by the extraction unit, which is associated with the attribute information of the occupant obtained by the obtaining unit.

The present invention in its second aspect provides a notification system comprising: an accepting unit configured to accept designation of attribute information from an occupant of a vehicle; an extraction unit configured to extract related facilities having predetermined relations to replenishing places for replenishing driving energy of the vehicle; and a notification unit configured to notify the occupant of a replenishing place corresponding to a predetermined related facility, among the related facilities extracted by the extraction unit, which is associated with the attribute information of the occupant, the designation of which is accepted by the accepting unit.

The present invention in its third aspect provides a notification method to be executed in a notification system for notifying candidates of a replenishing place for replenishing driving energy of a vehicle, comprising: obtaining attribute information of an occupant of a vehicle; extracting related facilities having predetermined relations to replenishing places for replenishing driving energy of the vehicle; and notifying the occupant of a replenishing place corresponding to a predetermined related facility, among the related facilities extracted in the extracting, which is associated with the attribute information of the occupant obtained in the obtaining.

The present invention in its fourth aspect provides a notification method to be executed in a notification system for notifying candidates of a replenishing place for replenishing driving energy of a vehicle, comprising: accepting designation of attribute information from an occupant of a vehicle; extracting related facilities having predetermined relations to replenishing places for replenishing driving energy of the vehicle; and notifying the occupant of a replenishing place corresponding to a predetermined related facility, among the related facilities extracted in the extracting, which is associated with the attribute information of the occupant, the designation of which is accepted in the accepting.

The present invention in its fifth aspect provides a non-transitory computer-readable storage medium storing a program winch causes a computer to function so as to: obtain attribute information of an occupant of a vehicle; extract related facilities having predetermined relations to replenishing places for replenishing driving energy of the vehicle; and notify the occupant of a replenishing place corresponding to a predetermined related facility, among the extracted related facilities, which is associated with the obtained attribute information of the occupant.

The present invention in its sixth aspect provides a non-transitory computer-readable storage medium storing a program which causes a computer to function so as to: accept designation of attribute information from an occupant of a vehicle; extract related facilities having predetermined relations to replenishing places for replenishing driving energy of the vehicle; and notify the occupant of a replenishing place corresponding to a predetermined related facility, among the extracted related facilities, which is associated with the attribute information of the occupant, the designation of which is accepted.

The present invention can notify an occupant of an appropriate replenishing place based on attribute information of the occupant.

Further features of the present invention will become apparent from the following description of exemplary embodiments with reference to the attached drawings.

BRIEF DESCRIPTION OF THE DRAWINGS

FIG. 7 is a view showing a table which is generated when associating occupant attribute information and surrounding facility attribute information with each other;

FIG. 10 is a view showing the relation between the occupant attribute information and the surrounding facility attribute information.

DESCRIPTION OF THE EMBODIMENTS

Figure 1:
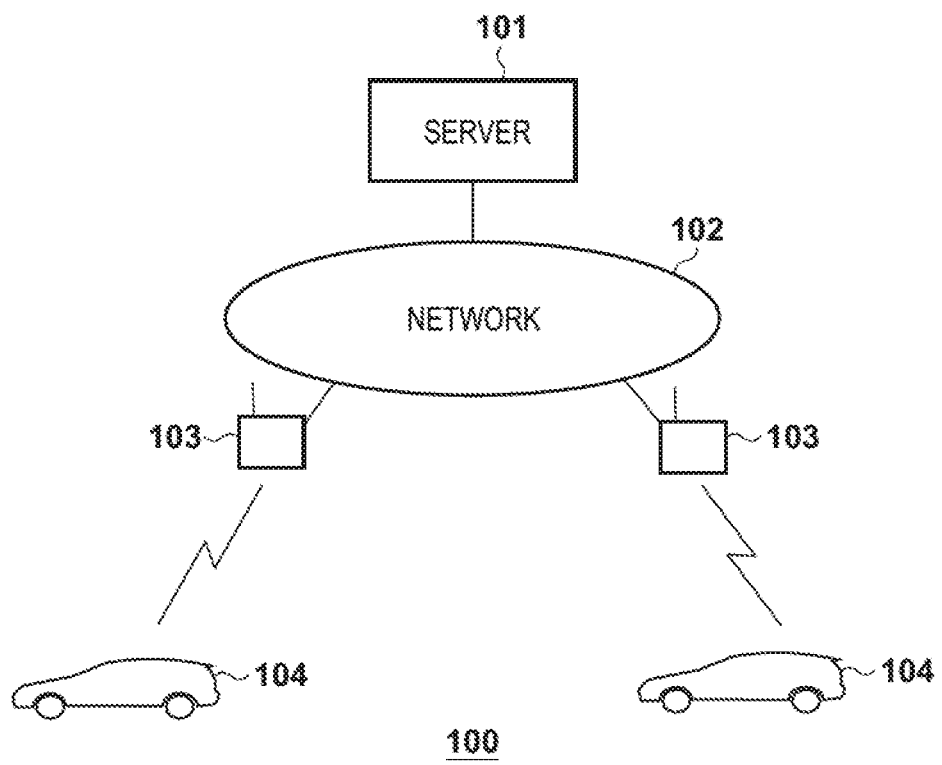
FIG. 1 is a view showing the configuration of a notification system.

Embodiments of the present invention will be explained below with reference to the accompanying drawings. Note that the same reference numerals denote the same constituent elements, and an explanation thereof will be omitted.

First Embodiment

FIG. 1 is a view showing the configuration of a notification system according to this embodiment. As shown in FIG. 1, a notification system 100 is so configured that a server 101 and wireless base stations 103 can communicate with each other across a network 102 including a wired or wireless medium. In this embodiment, a vehicle 104 will be explained as an electric vehicle such as a plug-in hybrid car incorporating a chargeable battery. Driving energy (to be simply referred to as energy hereinafter) for driving the vehicle 104 is electric energy. The energy includes not only electric energy but also fuel. An energy replenishing place is a charging spot when the energy is electric energy, or a gas station or the like when the energy is fuel. In the notification system 100, based on attribute information of occupants (including a driver and fellow occupants) of the vehicle 104, a list of charging spots probably appropriate for the occupants is displayed on a display or the like incorporated in the vehicle 104.

The wireless base station 103 is installed in a public facility such as a traffic signal, and relays data transmitted from the vehicle 104 to the server 101 across the network 102. The data transmitted from the vehicle 104 contains, for example, the attribute information of the occupants of the vehicle 104 and GPS information of the vehicle 104. For the sake of explanation, one wireless base station 103 corresponds to one vehicle 104 in FIG. 1. However, one wireless base station 103 corresponds to a plurality of vehicles 104 in some cases.

The server 101 searches for appropriate charging spots based on the data transmitted from the vehicle 104. In this embodiment, the server 101 extracts surrounding facilities matching the occupant attribute information of the vehicle 104. The surrounding facilities are facilities existing around a charging spot, and examples are a racetrack, a cafe, a park, and an amusement park. In this embodiment, charging spots having many surrounding facilities matching the occupant attribute information of the vehicle 104 are notified to the occupants of the vehicle 104 as a list of appropriate charging spots. With this configuration, the occupants can spend a meaningful time in the surrounding facilities while the vehicle 104 is charged at the charging spot. For example, a charging spot having a park as the surrounding facility is presented to a family taking a drive with a child. Therefore, the child can spend time without getting bored while the vehicle 104 is charged at the charging spot.

Figure 2A:
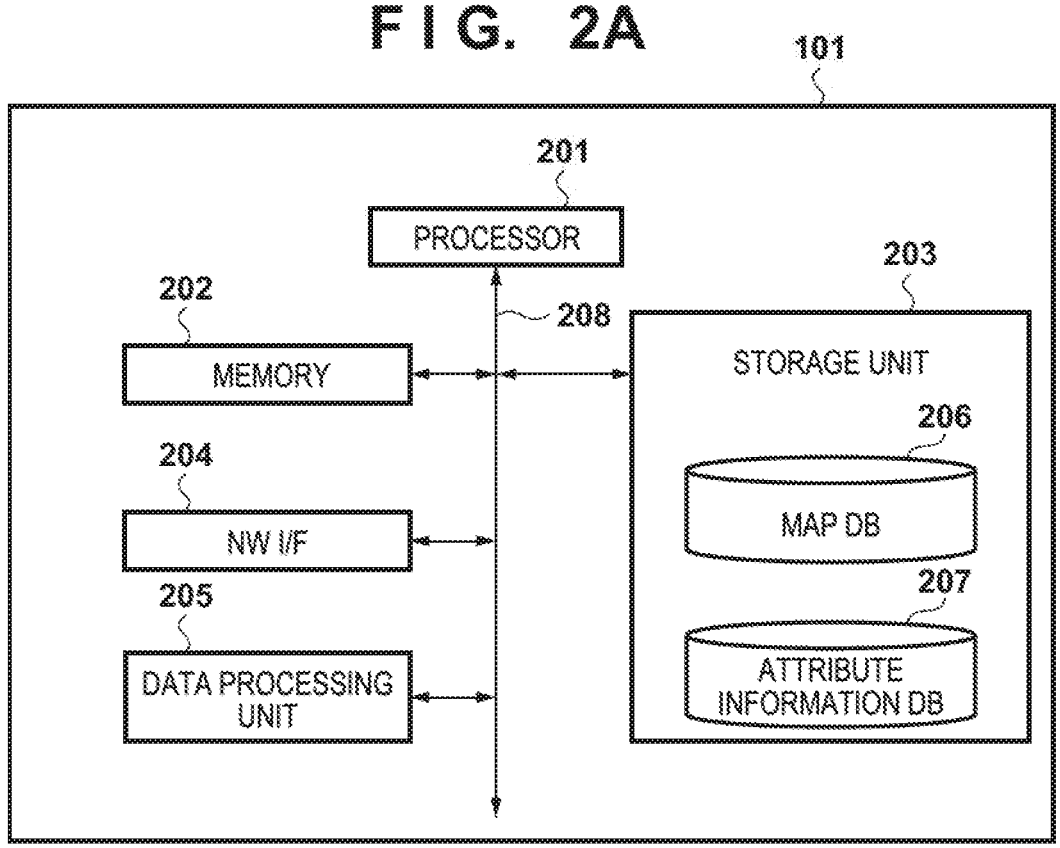
FIG. 2A is a view showing the configuration of a server.

FIG. 2A is a view showing the configuration of the server 101. A processor 201 comprehensively controls the server 101. For example, the processor 201 implements the operation of this embodiment by reading out a control program stored in a storage unit 203 to a memory 202 as an example of a storage medium, and executing the program. A network interface (NW I/F) 204 is an interface for enabling communication with the network 102, and has an arrangement corresponding to the medium of the network 102.

As will be described later, a data processing unit 205 performs, for example, matching between the occupant attribute information of the vehicle 104 and the surrounding facility information. The storage unit 203 stores data, parameters, programs, and the like necessary for the operation of the server 101. Various databases (DBs) such as a map DB 206 and an attribute information DB 207 are formed in the storage unit 203. The map DB 206 is a map DB containing road information, facility information, and traffic information, and also contains information of charging spots and surrounding facilities. The attribute information DB 207 stores the attribute information of each occupant of the vehicle 104. The occupant attribute information is information such as sex, age, a log of interactions with an interactive system, a log of searches on the Internet, and a preference obtained from Social Networking Service (hereinafter referred to as "SNS") information. The processor 201 may also daily collect the search log and SNS information on the Internet as big data. For example, when a given user is registered in the server 101 of the notification system 100, the processor 201 estimates the preference and the like of a registered user from the search log, SNS information, and the like of the registered user on the Internet, and stores the estimation result (for example, likes cafes) as attribute information in the attribute information DB. The abovementioned big data can also be used to extract the surrounding facility attribute information (to be described later) by data mining, text mining, or the like. The individual blocks shown in FIG. 2A can communicate with each other via a bus 208.

Figure 2B:
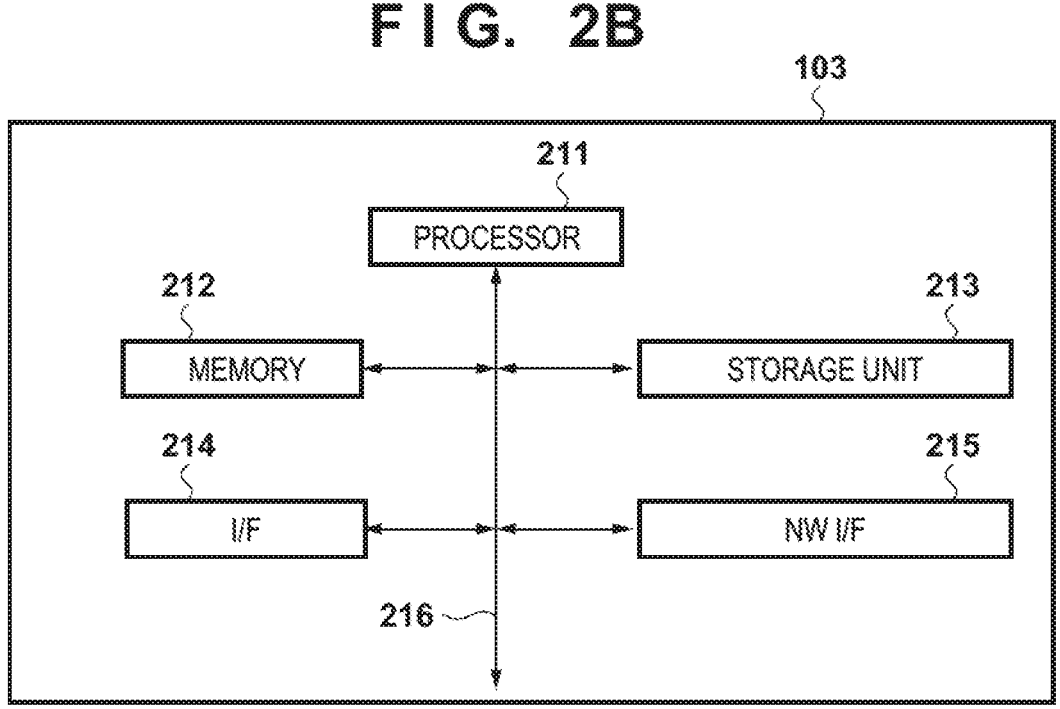
FIG. 2B is a view showing the configuration of a wireless base station.

FIG. 2B is a view showing the configuration of the wireless base station 103. A processor 211 comprehensively controls the wireless base station 103 by reading out a control program stored in a storage unit 213 to a memory 212 and executing the program. A network interface (NW I/F) 215 is an interface for enabling communication with the network 102, and has an arrangement corresponding to the medium of the network 102. An interface (I/F) 214 is a wireless communication interface for the vehicle 104. The wireless base station 103 receives data containing occupant information and GPS information from the vehicle 104 via the I/F 214. The occupant information is occupant identification information, for example, data indicating face image data or a feature amount. The received data is converted, and the converted data is transmitted to the server 101 across the network 102 by the NW I/F 215. The individual blocks shown in FIG. 2B can communicate with each other via a bus 216.

Figure 3:
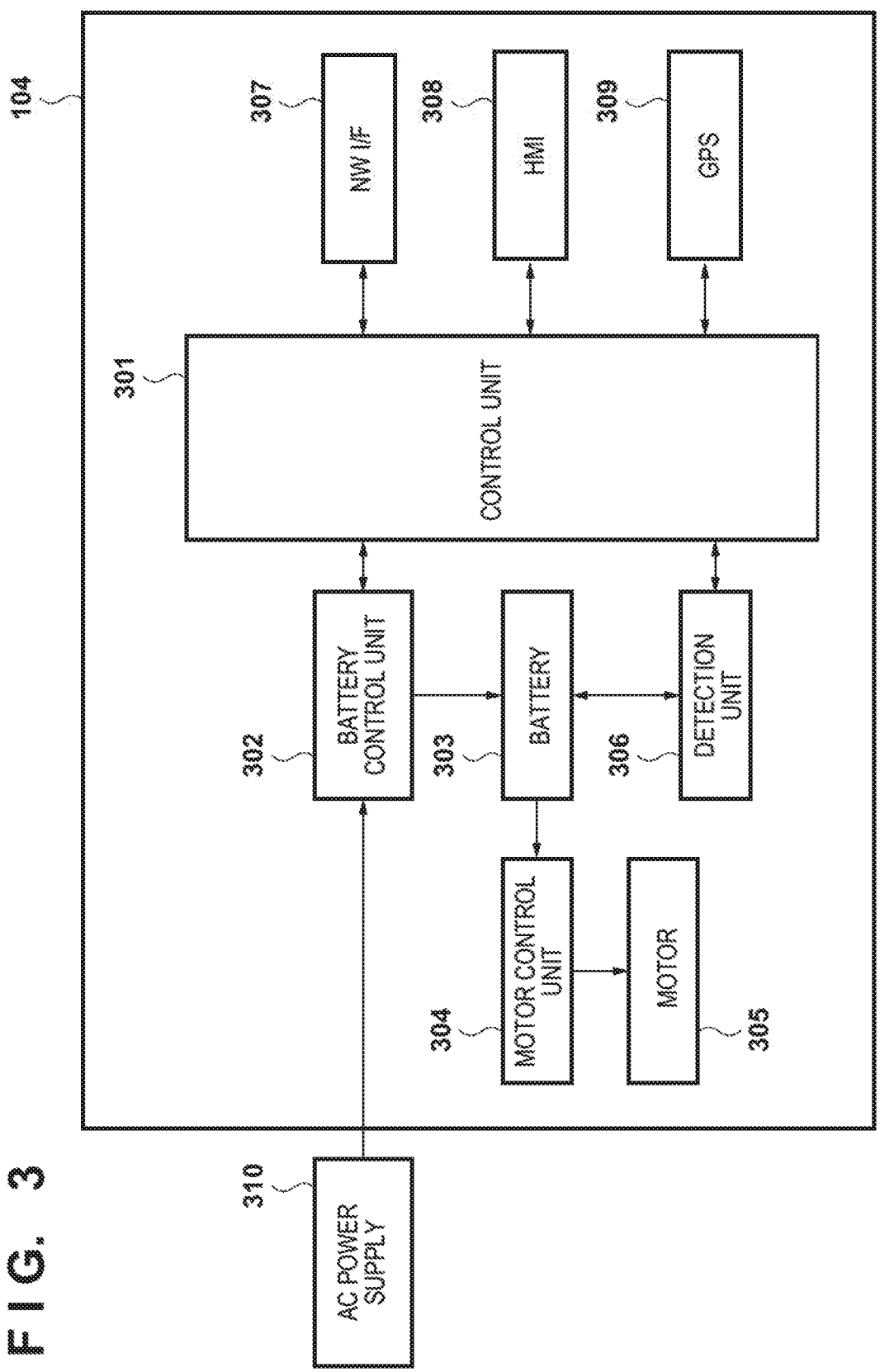
FIG. 3 is a view showing the configuration of a vehicle.

FIG. 3 is a view showing the configuration of the vehicle 104. FIG. 3 shows the arrangement of main blocks around the battery. A control unit 301 includes an ECU for determining the charging state (for example, fully charged or not, and the residual capacity) of a battery 303 based on detection information from a detection unit 306, and an ECU for executing a charging spot searching process according to this embodiment.

A battery control unit 302 detects a connection between the vehicle 104 and an external AC power supply 310, and charges the battery 303 by using a charger. The battery 303 is a battery chargeable by electric power supplied from the external AC power supply 310. The detection unit 306 detects the residual capacity, temperature, and the like of the battery 303, and transmits the detection signal to the control unit 301. A motor control unit 304 includes an inverter which converts the voltage of the battery 303 into a driving voltage and supplies the driving voltage to a motor 305. The motor 305 allows the vehicle 104 to travel by the driving voltage supplied from the motor control unit 304.

The control unit 301 transmits data containing the occupant identification information and GPS information to the wireless base station 103 via a network interface (NW I/F) 307. As the occupant identification information, for example, imaging data captured by a camera installed in the vehicle 104, data representing the feature amount, and the like are transmitted to the wireless base station 103 via the NW I/F 307. An HMI 308 is a human-machine interface. The HMI 308 includes a display as a display unit, and displays a screen for displaying information indicating that the residual capacity of the battery 303 is small, and a screen capable of accepting an instruction to start execution of a charging spot searching process. A GPS 309 detects the current position of the vehicle 104.

Each of the configurations shown in FIGS. 2A to 3 explained above can be a computer for performing the present invention according to the program.

Figure 4:
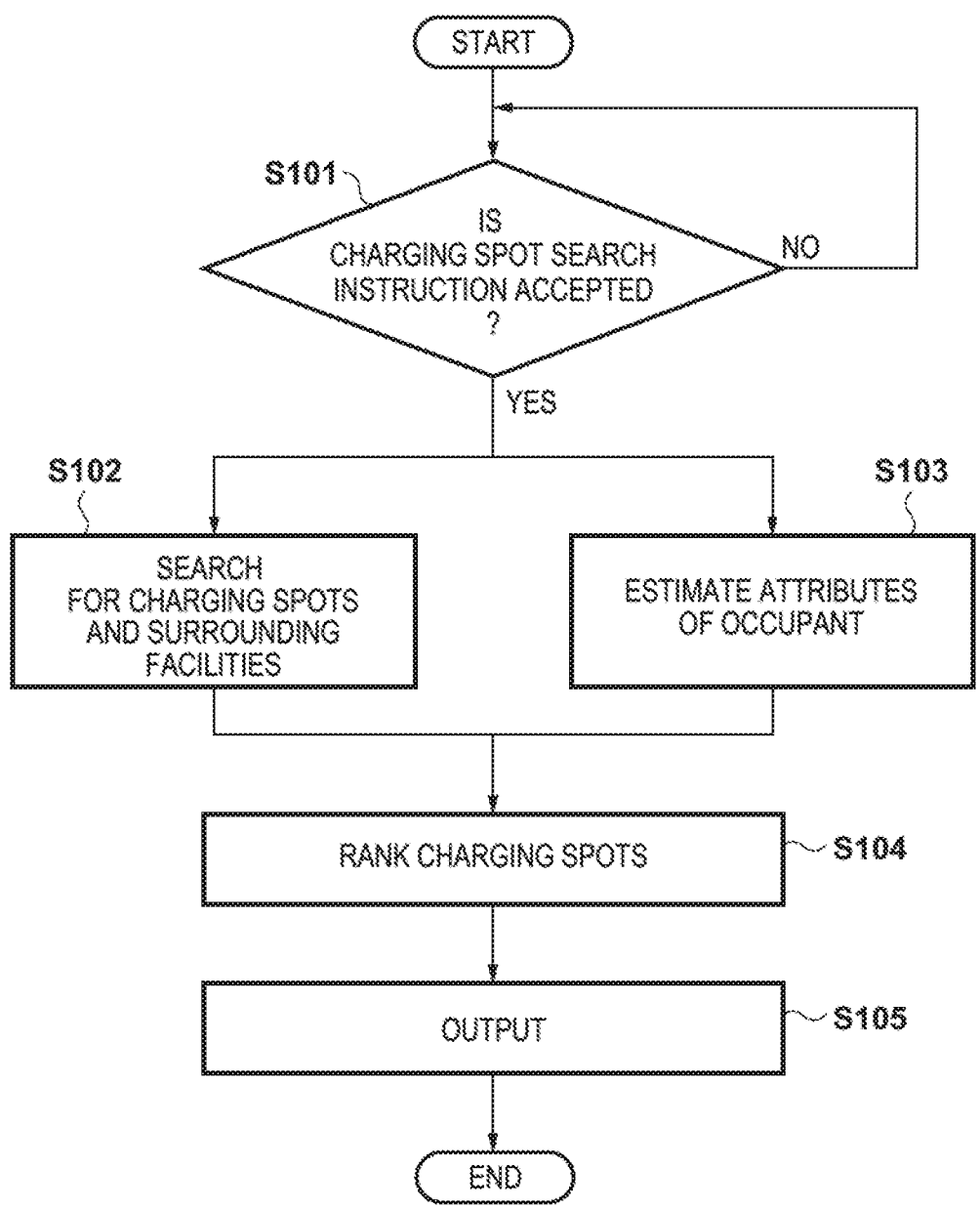
FIG. 4 is a flowchart showing a charging spot searching process.

FIG. 4 is a flowchart showing the charging spot searching process according to this embodiment. The charging spot searching process is executed in the notification system 100. FIG. 4 will be explained by assuming that the control unit 301 of the vehicle 104 implements processes in steps S101 and S105, and the processor 201 of the server 101 implements processing in steps S102 to S104. However, the vehicle 104 may also execute at least a part of the processing to be executed by the server 101.

In this embodiment, if the residual capacity of the battery 303 becomes equal to or smaller than a threshold, the control unit 301 displays on the HMI 308 a message for notifying an occupant that the residual capacity is equal to or smaller than the threshold, together with the display of a charging spot searching process execution start instruction button. For example, it is possible to display a message "The remaining amount of the battery is small. Search for charging spots?".

In step S101, the control unit 301 determines whether the charging spot searching process execution start instruction is accepted. The control unit 301 waits until it is determined that the charging spot searching process execution start instruction is accepted. If it is determined that the instruction is accepted, the control unit 301 transmits data necessary for the charging spot searching process to the wireless base station 103 via the NW I/F 307. After that, the process advances to steps S102 and S163 to be performed by the server 101.

The data necessary for the charging spot searching process is, for example, data indicating the GPS information and occupant information of the vehicle 104. The data indicating the occupant information is, for example, imaging data obtained by imaging the face of an occupant by a camera installed in the vehicle 104. It is also possible to transmit data obtained by extracting the feature amount, instead of the occupant imaging data, or transmit the both data. The data indicating the occupant information may also be transmitted to the wireless base station 103 at another timing. For example, it is also possible to start imaging an occupant when a registered user of the notification system 100 gets in the vehicle 104 and inputs an instruction via the HMI 308, and transmit the imaging data or data indicating the feature amount to the wireless base station 103.

The server 101 executes steps S102 and S163. In step S102, the processor 201 of the server 101 searches for a charging spot within a predetermined range from the current position to the vehicle 104, based on the GPS information received from the vehicle 104 via the wireless base station 103 and the map DB 206. In this step, the processor 201 also searches for surrounding facilities within a predetermined range from the charging spot.

In step S163, the processor 201 identified an occupant from the data indicating the occupant information received from the vehicle 104 via the wireless base station 103, and obtains attribute information corresponding to the identified occupant from the attribute information DB207. The contents of the obtained attribute information are, for example, the log of daily interactions with an interactive system by the identified occupant, and preference information obtained from the search log and SNS information on the Internet. For example, if there are many cafe information search logs and many pieces of information and many photographs indicating that the occupant went to cafes, the processor 201 estimates the occupant's preference that the occupant likes cafes.

In step S104, the processor 201 ranks the charging spots found in step S102. When performing ranking, this embodiment uses the surrounding facilities found in step S102 and the occupant attribute information obtained in step S163.

Figure 5:
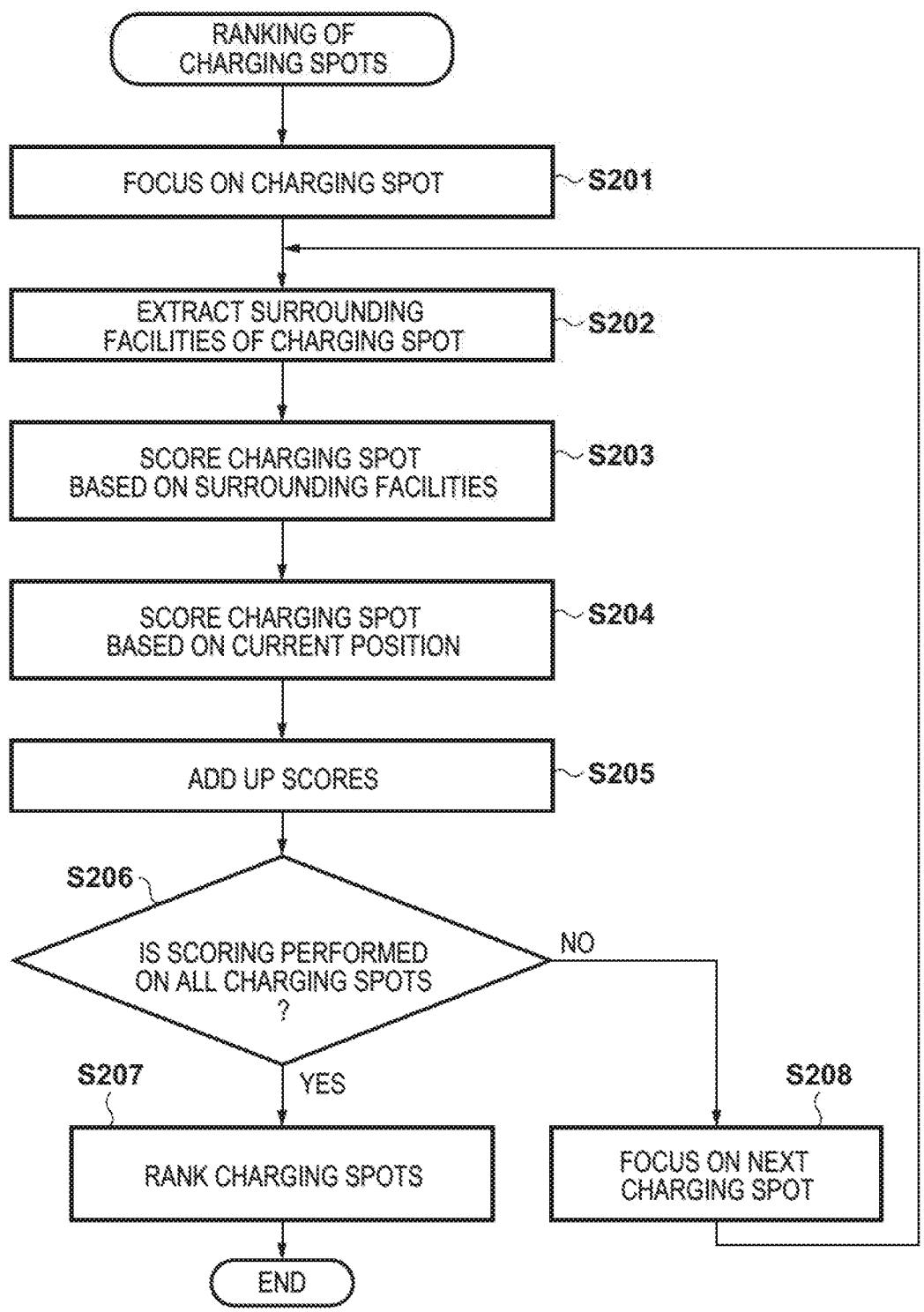
FIG. 5 is a flowchart showing a charging spot ranking process.

FIG. 5 is a flowchart showing the charging spot ranking process in step S104. In step S201, the processor 201 focuses on one of a plurality of charging spots found from the current position of the vehicle 104 and the map DB 206. This embodiment will be explained by assuming that a plurality of charging spots are found, but there is a case in which only one charging spot is found. The focused charging spot will be processed as follows.

In step S202, the processor 201 extracts a surrounding facility having a predetermined relation with the charging spot. Having the predetermined relation with the charging spot includes the condition that the surrounding facility exists in the site of the charging spot itself (the surrounding facility belongs to the charging spot), and the condition that the surrounding facility exists around the charging spot (the surrounding facility exists within a predetermined distance from the charging spot). In this embodiment, "a surrounding facility" extracted as described above will also be called "a related facility" because the surrounding facility has the predetermined relation with the charging spot. In step S203, the processor 201 scores the charging spot based on the surrounding facility extracted in step S202. The scoring in step S203 will be described later.

The predetermined distance for extracting the surrounding facility can be either a predetermined distance or a variable distance. For example, the predetermined distance can be changed based on weather information or a time zone of the day. For example, the predetermined distance when the weather is rain or the time zone is nighttime can be made shorter than that when the weather is fine or the time zone is daytime. With this configuration, when the weather is rain or the time zone is nighttime, it is possible to extract a surrounding facility to which the occupant need only walk a short distance after getting off the vehicle 104 at the charging spot. The predetermined distance can also be changed based on the attribute information such as the age of the occupant. For example, the predetermined distance can be shortened if the occupant is an aged person.

In step S204, the processor 201 stores the charging spot based on the current position of the vehicle 104. This storing in step S204 is performed so as to drop the score as the distance between the current position of the vehicle 104 and the charging spot prolongs, and raise the score as the distance shortens.

In step S205, the processor 201 adds up the scoring result in step S203 and the scoring result in step S204. The sum is the score of the charging spot focused in step S201.

In step S206, the processor 201 determines whether scoring is performed on all of the plurality of charging spots found from the current position of the vehicle 104 and the map DB 206. If it is determined that scoring is not performed on all of the plurality of charging spots, the processor 201 focuses on the next charging spot in step S208, and repeats the process from step S202. On the other hand, if it is determined that scoring is performed on all of the plurality of charging spots, the process advances to step S207.

In step S207, the processor 201 ranks the plurality of scored charging spots based on the scores. After that, the processor 201 terminates the process shown in FIG. 5.

Figure 6:
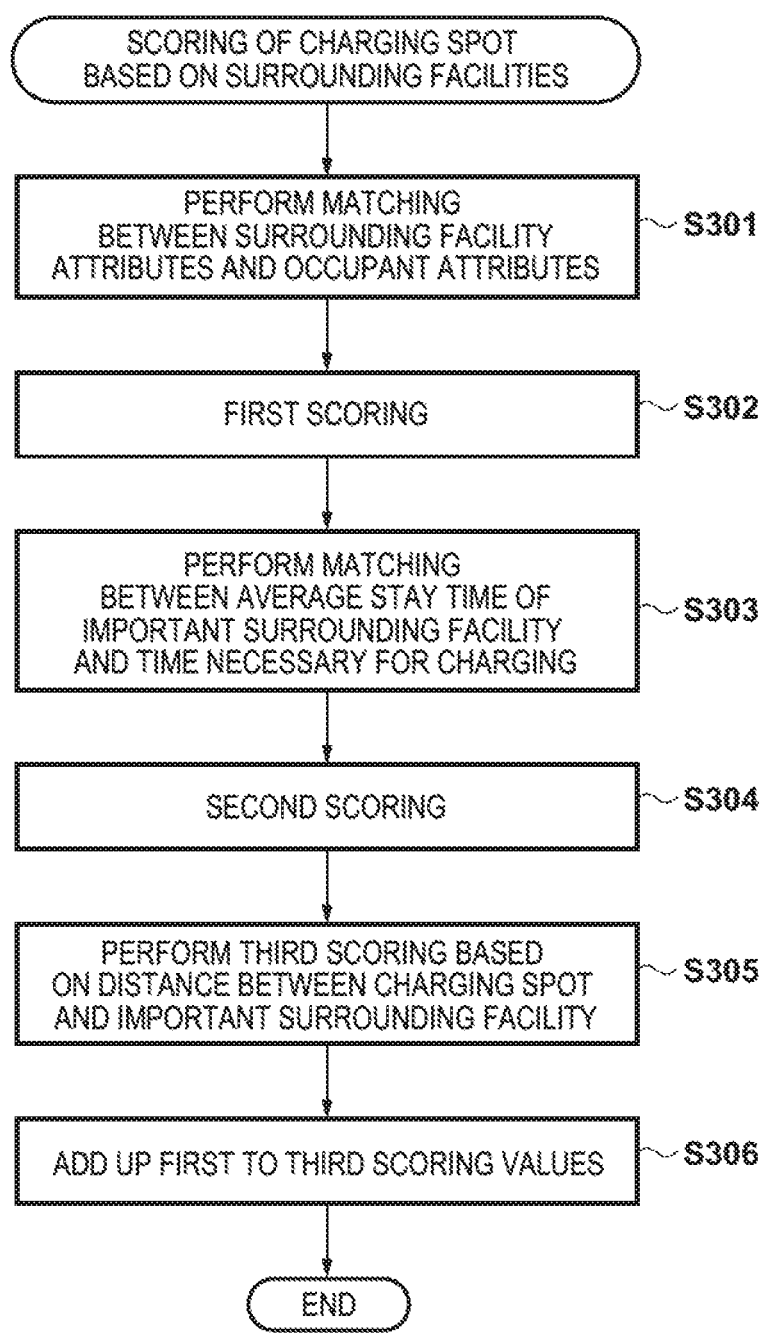
FIG. 6 is a flowchart showing a charging spot scoring process based on surrounding facilities.

FIG. 6 is a flowchart showing the charging spot scoring process based on the surrounding facility in step S203. In step S301, the processor 201 performs matching between surrounding facility attribute information and occupant attribute information, and extracts a surrounding facility (to be referred to as an important surrounding facility hereinafter) regarded as important (appropriate) for the occupant. In step S302, the processor 201 scores the charging spot based on the important surrounding facility extracted in step S301 (first scoring).

Extraction of the important surrounding facility regarded as important (appropriate) for the occupant of the vehicle 104 will be explained below. FIG. 10 is a view showing the relation between the attribute information of occupants of the vehicle 104 and the attribute information of surrounding facilities. Referring to FIG. 10, a 30- to 35-year-old female who likes cafes and a 3- to 6-year-old male are recognized as the occupants of the vehicle 104. The preference "likes cafes" of the female is, for example, the estimation result in step S163. There is no preference estimation result in some cases, like the male in this case. For example, there is no preference estimation result for the male because he is very young and has no information daily collected as big data such as search results on the Internet.

Charging spots within a predetermined range from the current position of the vehicle 104 having these female and male on board are found as charging spots A to Z. Surrounding facilities within a predetermined distance are also found, for example, a ○○ racetrack and a ○○ pinball saloon are found as surrounding facilities of the charging spot A. Surrounding facility attribute information is associated with each surrounding facility. For example, attribute information "gamble" is associated with the ○○ racetrack and the ○○ pinball saloon. As surrounding facility related information, highly-related words can be determined by data mining, text mining, or the like, with respect to the target age, opening hours, clientele, category, and the like. For example, pieces of attribute information such as 18 years old or more, cafe, and for females are associated with a ○○ cafe.

The processor 201 of the server 101 specifies surrounding facility attribute information to be matched with the occupant attribute information of the vehicle 104. For example, in FIG. 10, the contents of the occupant attribute information are "female", "30 to 35 years old", "likes cafes", "male", and "3 to 6 years old", so the contents of the surrounding facility attribute information to be matched are "18 years old or more", "3 to 6 years old", "cafe", "for males", and "for females". Based on the matched surrounding facility attribute information, highly-associated surrounding facilities are traced, and corresponding surrounding facilities are extracted as important surrounding facilities. In FIG. 10, thick lines indicate routes found to be highly associated from the occupant attribute information. Referring to FIG. 10, a ○○ cafe, a ○○ park, and a ○○ amusement park are extracted as important surrounding facilities regarded as important for the occupants of the vehicle 104. Scoring in step S302 may also be performed based on, for example, the ratio of the important surrounding facilities to the surrounding facilities extracted in step S202.

FIG. 6 will be explained again. In step S303, the processor 201 performs matching between the average stay time of the important surrounding facility and the time necessary to charge the battery 303 of the vehicle 104. The average stay time can be obtained by collecting customer attraction information of each surrounding facility for a predetermined period in advance, and calculating the average value of the stay times. The time necessary to charge the battery 303 can be calculated based on the information of the residual capacity of the battery 303, which is received from the vehicle 104.

In step S304, the processor 201 scores the charging spot based on the degree of matching in step S303 (second scoring). For example, the processor 201 raises the score as the difference between the average stay time of the important surrounding facility and the time necessary to charge the battery 303 decreases, and drops the score as the difference increases.

In step S305, the processor 201 scores the charging spot based on the distance between the charging spot and each important facility (third scoring). For example, scoring is performed based on the ratio of the distance between each of important facilities A and B and the charging spot to a predetermined distance.

In step S306, the processor 201 adds up the scores obtained by the first to third scorings, and sets the sum as the score of the focused charging spot in step S201. After that, the processor 201 terminates the process shown in FIG. 6.

FIG. 7 is a view showing an example of a table in which the charging spots found within a predetermined range from the current position of the vehicle 104 are associated with the attribute information of the surrounding facilities. An example of scoring will be explained below with reference to FIG. 7. This table shown in FIG. 7 is stored in, for example, the storage unit 203. Referring to FIG. 7, the occupants of the vehicle 104 are a family of three: a 30-year-old male who likes Japanese cuisine, a 20-year-old female, and a 2-year-old male. That is, the contents of the occupant attribute information are "30-year-old male". "Japanese cuisine", "20-year-old female". "2-year-old male", and "family".

In FIG. 7, three charging spots, that is, an AA charging stand, a BB charging stand, and a CC charging station are found within the predetermined range from the current position of the vehicle 104. Note that the current conditions are that the time zone is nighttime, the weather is rain, and the time necessary to charge the battery 303 is 30 minutes. The distances from the current position of the vehicle 104 to the AA charging stand, BB charging stand, and CC charging station are respectively 1.5, 2, and 3 km.

An A racetrack and an A pinball saloon are extracted within a predetermined distance from the AA charging stand. This predetermined distance is determined based on the abovementioned occupant attribute information, and time/weather information "nighttime, rain". In FIG. 7, the A racetrack and the A pinball saloon are extracted as surrounding facilities within the predetermined distance (for example, 500 m) from the AA charging stand. Also, an average stay time is obtained as 1 hour for both the A racetrack and the A pinball saloon.

Referring to FIG. 7, the contents of the attribute information of the A racetrack are "acquaintances/friends", "unaccompanied", "gamble", "horse racing", for "for adults", and the contents of the attribute information of the A pinball saloon are "unaccompanied", "gamble", "pinball", and "for adults". In step S301 of FIG. 6, matching is performed between these pieces of surrounding facility attribute information and the abovementioned occupant attribute information.

In this matching between the surrounding facility attribute information and the occupant attribute information, "matched/mismatched" can be determined based on the correlation distance. For example, the correlation distance is long between "2-year-old male (=child)" and "gamble". Also, the correlation distance is short between "family" and "for acquaintances/friends" or "barrier free". The correlation distance like this may also be predetermined by cluster analysis or the like. In this matching, "matched" can be counted when the correlation distance is equal to or smaller than a threshold. Also, if attribute information for which the correlation distance is equal to or larger than a threshold is contained, matching of attribute information of the corresponding surrounding facility can be counted as 0. For example, for the A racetrack and the A pinball saloon, attribute information "gamble" having a correlation distance equal to or larger than the threshold from "child" is contained, so matching of the attribute information is counted as "0" for each of the A racetrack and the A pinball saloon.

In step S303 of FIG. 6, matching is performed between average stay time=1 hour and necessary charging time=30 minutes. For example, since the average stay time is twice the necessary charging time, "0.5" is used in scoring of the AA charging stand. That is, the closer the average stay time to the necessary charging time, the higher the score. In step S305 of FIG. 6, scoring is performed based on the distance between the charging spot and each important surrounding facility. For example, the distance of the A racetrack from the charging spot is 100 m. For example, based on the ratio to a predetermined distance (for example, 500 m), 500 m/100 m=5 is used in scoring of the AA charging stand. Also, the distance of the A pinball saloon from the charging spot is 30 m. For example, based on the ratio to the predetermined distance (500 m), 500 m/30=16.7 is used in scoring of the AA charging stand. That is, the shorter the distance from the charging spot, the higher the score. Furthermore, in step S204 of FIG. 6, scoring is performed based on the distance of the AA charging stand from the current position of the vehicle 104. For example, since the distance from the current position of the vehicle 104 is 1.5 km, the ratio to a predetermined range (for example, 4 km), that is, 4 km/1.5 km=2.7 is used in scoring of the AA charging stand. That is, the shorter the distance from the current position of the vehicle 104, the higher the score.

From the foregoing, the score of the A racetrack is calculated as 0×0.5×5=0, and the score of the A pinball saloon is calculated as 0×0.5×16.7=0. Consequently, scoring is performed as 0+0+2.7=2.7 for the AA charging stand.

In the above explanation, scoring is performed for the A racetrack and the A pinball saloon. However, if matching of the attribute information is counted as "0", it is possible to determine that the surrounding facility is not important for the occupant, and set 0 as the score. A configuration like this facilitates extracting an important facility.

The BB charging stand will now be explained. A BA restaurant and a BB restaurant are extracted within a predetermined distance from the BB charging stand. This predetermined distance is determined based on the abovementioned occupant attribute information and time/weather information "nighttime, rain". In FIG. 7, The BA restaurant and the BB restaurant are extracted as surrounding facilities within the predetermined distance (for example, 500 m) from the BB charging stand. Also, the average stay time of the BA restaurant is obtained as 30 minutes, and that of the BB restaurant is obtained as 45 minutes.

Referring to FIG. 7, the contents of the attribute information of the BA restaurant are "unaccompanied", "for family", "for acquaintances/friends", "kids allowed", "barrier free", and "Chinese cuisine". The contents of the attribute information of the BB restaurant are "for couples", "for adults", and "French cuisine". In step S301 of FIG. 6, matching is performed between the attribute information of these surrounding facilities and the abovementioned occupant attribute information.

This matching between the surrounding facility attribute information and the occupant attribute information is performed as described above. If there are a plurality of pieces of surrounding facility attribute information, matching/mismatching can be determined by totally considering the information. For example, the BB restaurant is "for couples", "for adults", and "for French cuisine", so the prices may be high. In this case, therefore, it is possible to determine that "for adults" is a concept which excludes "children", so the surrounding facility attribute information "for adults" does not match the occupant attribute information, or the degree of matching is small. Also, the BA restaurant is for "Chinese cuisine" not "Japanese cuisine", but the prices can be regarded as reasonable from the attribute information "for family" "kids allowed". In this case, therefore, it is possible to determine that "Chinese cuisine" matches "Japanese cuisine". For the BA restaurant, "for family", "for acquaintances/friends", "kids allowed", "barrier free", and "Chinese cuisine" are matched features, so the matched features are counted as "5". On the other hand, for the BB restaurant, the matched feature "for adults" is counted as "0.5".

In step S303 of FIG. 6, matching is performed between average stay time=30 mm of the BB restaurant and necessary charging time=30 min. For example, the average stay time is equal to the necessary charging time, so "1" is used in scoring of the BB charging stand. In addition, matching is performed between average stay time=45 min of the BB restaurant and necessary charging time=30 min. For example, 30/45=0.7 is used in scoring of the BB charging stand. In step S305 of FIG. 6, scoring is performed based on the distance between the charging spot and each important surrounding facility. For example, the distance of the BA restaurant from the charging spot is 500 m. For example, based on the ratio to a predetermined distance (for example, 500 m), 500 m/500 m=1 is used in scoring of the BB charging stand. Also, the distance of the BB restaurant from the charging spot is 30 m. For example, based on the ratio to a predetermined distance (for example, 500 m), 500 m/30 m=16.7 is used in scoring of the BB charging stand. In step S204 of FIG. 6, scoring is performed based on the distance of the BB charging stand from the current position of the vehicle 104. For example, since the distance from the current position of the vehicle 104 is 2 km, the ratio to a predetermined range (for example, 4 km), that is, 4 km/2 km=2 is used in scoring of the BB charging stand.

From the foregoing, the score of the BA restaurant is calculated as 5×1×1=5, and the score of the BB restaurant is calculated as 0.5×0.7×16.7=5.85. Consequently, scoring is performed as 5+5.85+2=12.85 for the BB charging stand.

Next, the CC charging station will be explained. A C restaurant is extracted within a predetermined distance from the CC charging station. This predetermined distance is determined based on the abovementioned occupant attribute information and time/weather information "nighttime, rain". In FIG. 7, the C restaurant is extracted as a surrounding facility within the predetermined distance (for example, 500 m) from the CC charging station. Also, the average stay time of the C restaurant is obtained as 30 min.

Referring to FIG. 7, the contents of the attribute information of the C restaurant are "unaccompanied", "for family", "for acquaintances/friends", "kids allowed", "barrier free", and "Japanese cuisine". In step S301 of FIG. 6, matching is performed between these pieces of surrounding facility attribute information and the abovementioned occupant attribute information. For the C restaurant, "for family", "for acquaintances/friends", "kids allowed", "barrier free", and "Japanese cuisine" are matched features, so the matched features are counted as "5".

In step S303 of FIG. 6, matching is performed between average stay time=30 ruin of the C restaurant and necessary charging time=30 min. For example, the average stay time and the necessary charging time are equal, so "1" is used in scoring of the CC charging station. In step S305 of FIG. 6, scoring is performed based on the distance between the charging spot and each important surrounding facility. For example, the distance of the C restaurant from the charging spot is 30 m. For example, based on the ratio to a predetermined distance (for example, 500 m), 500 m/30 m=16.7 is used in scoring of the CC charging station. In step S204 of FIG. 6, scoring is performed based on the distance of the CC charging station from the current position of the vehicle 104. For example, since the distance from the current position of the vehicle 104 is 3 km, the ratio to a predetermined range (for example, 4 km), that is, 4 km/3 km=1.3 is used in scoring of the CC charging station.

From the foregoing, the score of the C restaurant is calculated as 5×1×16.7=83.5. Consequently, scoring is performed as 83.5+1.3=84.8. That is, ranking can be performed in the order of scores such that AA charging stand=2.7, BB charging stand=12.85, and CC charging station=84.8.

As described above, the calculation is performed for each charging spot as an example of "index representing matching of attribute information"×"index according to average stay time"×"index according to distance between charging spot and surrounding facility"+"index according to distance from current position of vehicle to charging spot"=score. However, the present invention is not limited to the abovementioned calculation method, and another calculation method may also be used. For example, each term of the above equation may also be weighted. With this configuration, the importance of each of the attribute information matching degree, the average stay time, and the distance information can be reflected on the score. In addition, the index calculation method is also not limited to the above example. For example, the above example uses the index calculation method which increases the score as the difference between the stay time of each surrounding facility and the charging time decreases. However, it is also possible to use an index calculation method which does not change the score if the stay time is longer than the charging time.

FIG. 4 will be explained again. When the charging spots are ranked in step S104, the processor 201 of the server 101 transmits the information of the charging spots and surrounding facilities together with the charging spot ranking information to the vehicle 104 via the wireless base station 103.

In step S104, the control unit 301 of the vehicle 104 outputs data to the occupant based on the information of the charging spots and surrounding facilities and the charging spot ranking information. For example, the control unit 301 displays screens as shown in FIGS. 8A and 8B on the HMI 308.

Figure 8A:
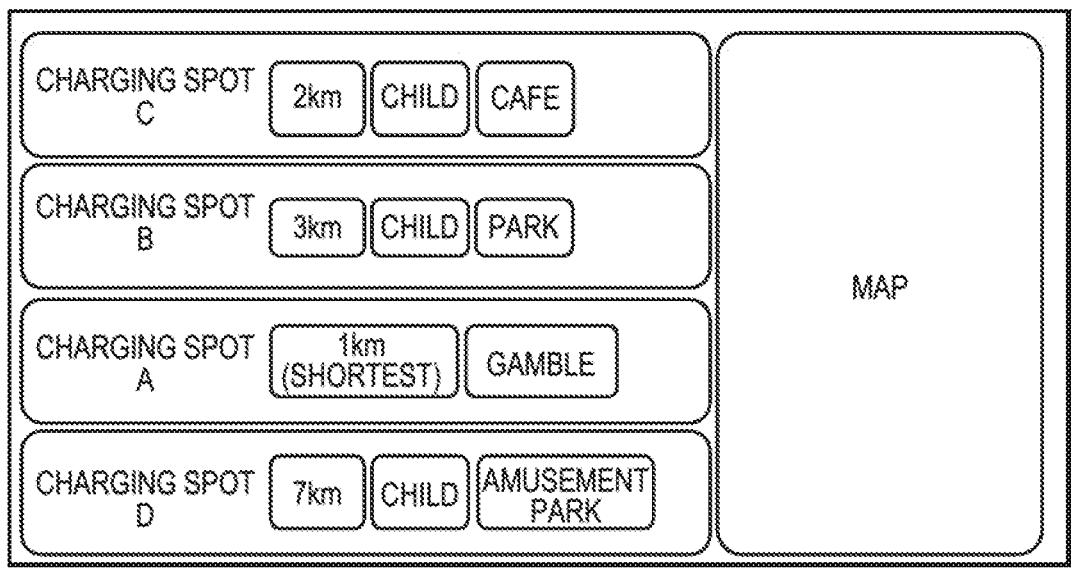
FIG. 8A is a view showing a screen displaying a charging spot list.

As shown in FIG. 8A, the screen displays, as a list of candidates, four charging spots having higher scores among the charging spots within the predetermined range from the current position of the vehicle 104. FIG. 8A shows only four charging spots C, B, A, and D, but the number of charging spots is not limited to four. For example, it is also possible to display charging spot candidates having lower scores by pressing a "display next page" button or the like. Also, in FIG. 8A, "shortest" is displayed for a charging spot at the shortest distance from the current position of the vehicle 104. On the right side of the screen shown in FIG. 8A, the current position of the vehicle 104 and the positions of the charging spots C, B, A, and D are displayed so as to be identifiable on the map. By thus displaying only a predetermined number of highly-ranked charging spots, it is possible to improve the convenience of search for charging spots appropriate for the occupant.

In addition, on the side of the display of each charging spot, the distance from the current position of the vehicle 104 and the surrounding facility attribute information are displayed as icons. With this confirmation, the occupant can easily recognize facilities around each charging spot and the attributes of these facilities.

Figure 8B:
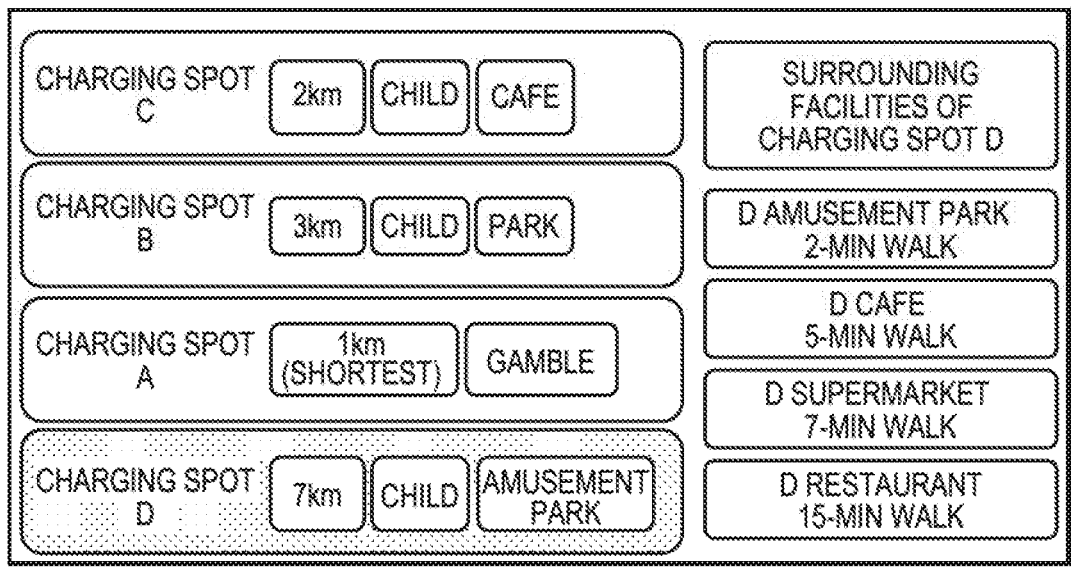
FIG. 8B is a view showing a screen displaying a charging spot list.

The screen as shown in FIG. 8B is displayed when the occupant clicks "charging spot D" on the screen shown in FIG. 8A. As shown in FIG. 8B, this screen displays a list of surrounding facilities existing around the charging spot D. As shown in FIG. 8B, the surrounding facilities existing around the charging spot D are displayed in the order of distance information from the charging spot D.

In this embodiment as described above, if the residual capacity of the battery 303 of the vehicle 104 decreases, a charging spot having a nearby surrounding facility regarded as appropriate for an occupant can be presented to the occupant. As a consequence, the occupant can get off the vehicle 104 and spend a meaningful time while the battery 303 is charged.

In this embodiment as described above, the processor 201 of the server 101 performs matching between the occupant attribute information and the surrounding facility attribute information. In this process, the occupant can also designate surrounding facility attribute information. A configuration like this will be explained below.

Figure 9A:
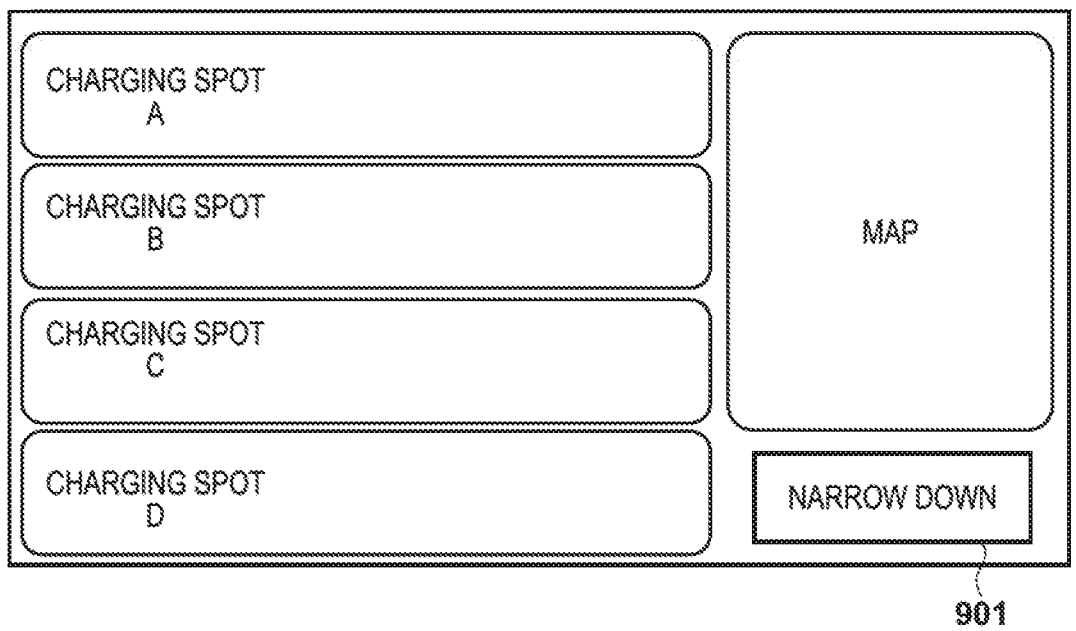
FIG. 9A is a view showing a screen displaying a charging spot list.

FIG. 9A is a view showing an example of a screen displayed on the HMI 308, when the processor 201 of the server 101 extracts given charging spots within a predetermined range from the current position of the vehicle 104, and transmits information of the extracted charging spots to the vehicle 104.

Figure 9B:
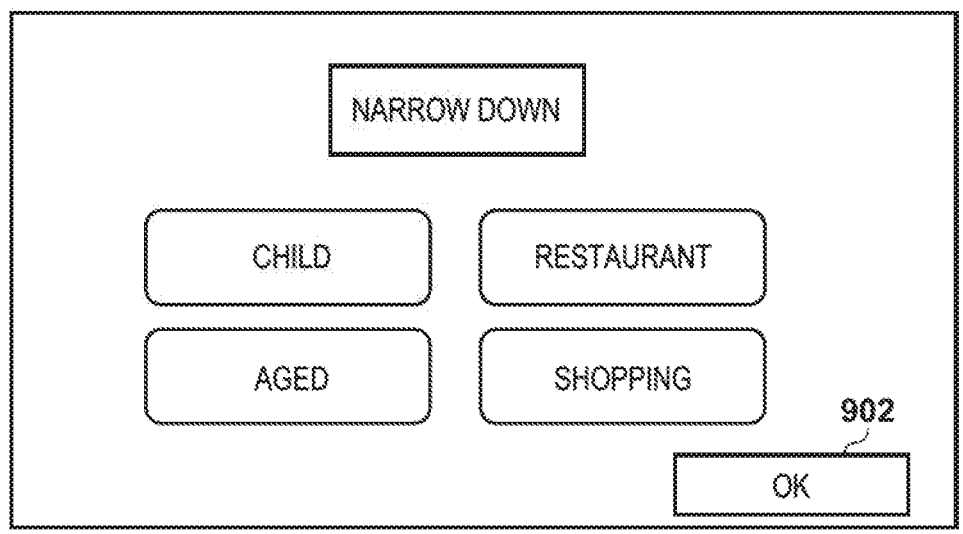
FIG. 9B is a view showing a screen displaying a charging spot list.

As shown in FIG. 9A, these charging spots have not been scored yet. When the occupant presses a "narrow down" button 901, narrow-down conditions are displayed so as to be selectable as shown in FIG. 9B. In FIG. 9B, "child", "restaurant", "aged", and "shopping" are displayed as the narrow-down conditions. These conditions represent surrounding facility attribute information. For example, when the occupant selects "child" and presses an OK button 902, this information is transmitted to the server 101 via the wireless base station 103. The processor 201 of the server 101 searches for surrounding facility attribute information matching the attribute information "child", and performs scoring such that a charging spot having the found surrounding facility nearby gets a high score. Note that a plurality of conditions can be selected in FIG. 9B. After ranking the charging spots, the processor 201 transmits information of the ranking to the control unit 301 of the vehicle 104. The control unit 301 causes the HMI 308 to display a list of the charging spots which are rearranged in accordance with the received ranking information. A screen displayed in this case is the same as that shown in FIG. 8B.

With the configuration as shown in FIG. 9B, attribute information selected by the occupant can directly be transmitted to the server 101. This makes it possible to extract a surrounding facility more reflecting attribute information desired by the occupant.

Second Embodiment

Differences of the second embodiment from the first embodiment will be explained below. In the first embodiment, the control unit 301 of the vehicle 104 displays the screens shown in FIGS. 8A and 8B on the HMI 308 in step S105 of FIG. 4. However, charging spots may also be presented to the occupant by another output method. For example, charging spots can be output by speech from a speaker installed in the vehicle 104. A configuration like this will be explained below.

In the first embodiment, the charging spot searching process is started if it is determined in step S101 of FIG. 4 that the charging spot search instruction is accepted via the screen. In this embodiment, an occupant inputs an instruction by speech via a microphone (not shown) installed in a vehicle 104. For example, if information indicating that the residual capacity of a battery 303 is small is notified on an HMI 308, the occupant inputs "report recommended charging spots" by speech toward the microphone. Note that data containing occupant information and GPS information is transmitted to a server 101 in the same manner as in the first embodiment.

Processes in steps S102 to S104 of FIG. 4 are the same as those in the explanation of the first embodiment. When receiving information of charging spots and surrounding facilities and charging spot ranking information from the server 101, a control unit 301 of the vehicle 104 outputs information of a charging spot having the highest score by speech from a speaker. For example, the control unit 301 outputs the speech "How about a charging spot C? There are a cafe and park for children nearby. The distance is 2 km" from the speaker.

Also, the occupant can narrow down the attributes by speech in response to the above voice output. For example, the occupant inputs the speech "I prefer a spot having an amusement park nearby" in response to the voice output about the charging spot C described above. Then, the control unit 301 outputs information about charging spots having surrounding facilities matching the attribute information "amusement park" by speech from the speaker. For example, the control unit 301 outputs the speech "A charging spot Z is 7 km ahead and has an amusement park nearby" from the speaker. This charging spot output from the speaker has a high score among charging spots matching the attribute information.

In this embodiment, even when the occupant cannot use hands and cannot look aside, appropriate charging spots can be presented to the occupant. Also, the present invention is not limited to the abovementioned example, and it is also possible to obtain a common taste of occupants as attribute information from the conversation between the occupants. Based on this attribute information, it is possible to extract important surrounding facilities and score corresponding charging spots.

The individual embodiments have been explained above. Note that the present invention is not limited to the abovementioned embodiments, and includes arrangements, changes, and modifications without departing from the spirit and scope of the invention. Note also that not all combinations of the features explained in these embodiments are essential to the present invention.

Summary of Embodiments

The notification system of the above embodiment comprises an obtaining unit (S163) configured to obtain attribute information of an occupant of a vehicle, an extraction unit (FIG. 6) configured to extract related facilities having predetermined relations to replenishing places for replenishing driving energy of the vehicle, and a notification unit (S105, FIGS. 8A and 8B) configured to notify the occupant of a replenishing place corresponding to a predetermined related facility, among the related facilities extracted by the extraction unit, which is associated with the attribute information of the occupant obtained by the obtaining unit.

With this configuration, it is possible to, for example, extract a surrounding facility based on the attribute information of the occupant, and notify the occupant of a charging spot corresponding to the surrounding facility.

The extraction unit extracts the related facilities by matching between the attribute information of the occupant and attribute information of the related facilities. With this configuration, it is possible to extract a surrounding facility found to have attribute information that matches.

The system further comprises a ranking unit configured to, if there are a plurality of replenishing places corresponding to the predetermined related facility, rank the plurality of replenishing places, wherein the notification unit notifies the occupant of a list of the plurality of replenishing places ranked by the ranking unit. With this configuration, it is possible to, for example, notify an occupant of a plurality of ranked charging stations.

The notification unit displays the replenishing places together with attribute information of the predetermined related facility on a display unit. The notification unit also outputs the replenishing places together with attribute information of the predetermined related facility by speech from a speaker. With this configuration, it is possible to, for example, display a list of charging stations together with the attribute information in the form of a list, or output the list to a speaker.

The ranking unit scores the replenishing place corresponding to the predetermined related facility based on attribute information of the predetermined related facility, and ranks the plurality of replenishing places based on the score of the replenishing place having undergone the scoring. With this configuration, it is possible to, for example, score charging stations based on surrounding facility distance information, and rank the charging stations based on the scores. The ranking unit also scores the replenishing place corresponding to the predetermined related facility, based on an average stay time as the attribute information of the predetermined related facility. The ranking unit further scores the replenishing place corresponding to the predetermined related facility, based on the average stay time and a time necessary to replenish the driving energy. With this configuration, it is possible to, for example, score a charging station based on the average stay time of a surrounding facility.

The ranking unit scores the replenishing place corresponding to the predetermined related facility, based on a distance from the replenishing place as the attribute information of the predetermined related facility. With this configuration, it is possible to, for example, score a charging station based on a distance between the charging station and the predetermined related facility.

The extraction unit extracts a facility within a predetermined distance from the replenishing place, as the related facility. Also, the predetermined distance is determined based on the attribute information of the occupant. With this configuration, it is possible to, for example, extract a surrounding facility within a distance determined based on the age and sex of the occupant.

In the system, the vehicle is an electric vehicle, and the replenishing place is a charging spot for charging a battery mounted in the vehicle. With this configuration, it is possible to, for example, extract a surrounding facility based on attribute information of an occupant, and notify the occupant of a charging spot corresponding to the surrounding facility.

What is claimed is:

1. A notification system comprising:
   at least one processor circuit with a memory comprising instructions, that when executed by the processor circuit, causing the processor circuit to at least:
   obtain attribute information of an occupant of a vehicle;
   extract related facilities having predetermined relations to replenishing places for replenishing driving energy of the vehicle;
   rank a plurality of replenishing places, if there are the plurality of replenishing places corresponding to a predetermined related facility, among the related facilities extracted, which is associated with the attribute information of the occupant obtained; and
   notify the occupant of a list of the plurality of replenishing places,
   wherein the at least one processor circuit is configured to perform first scoring on each of the plurality of replenishing places based on attribute information obtained from the predetermined related facility in advance, perform second scoring on each of the plurality of replenishing places based on a current position of the vehicle, and rank the plurality of replenishing places based on results of the first and second scoring, and
   the attribute information obtained from the predetermined related facility in advance includes average stay time, and the first scoring is performed based on the average stay time and time necessary to replenish driving energy of the vehicle.

2. The system according to claim 1, wherein the at least one processor circuit is further configured to extract the predetermined related facilities by matching between the attribute information of the occupant and attribute information of the related facilities.

3. The system according to claim 1, wherein the at least one processor circuit is further configured to display the notification unit displays the replenishing places together with the attribute information of the predetermined related facility on a display unit.

4. The system according to claim 1, wherein the at least one processor circuit is further configured to output the notification unit outputs the replenishing places together with the attribute information of the predetermined related facility by speech from a speaker.

5. The system according to claim 1, wherein the at least one processor circuit is further configured to score the replenishing place corresponding to the predetermined related facility, based on a distance from the replenishing place as the attribute information of the predetermined related facility.

6. The system according to claim 1, wherein the at least one processor circuit is further configured to extract a facility within a predetermined distance from the replenishing place, as the related facility.

7. The system according to claim 6, wherein the predetermined distance is determined based on the attribute information of the occupant.

8. The system according to claim 1, wherein the vehicle is an electric vehicle, and the replenishing place is a charging spot for charging a battery mounted in the electric vehicle.

9. A notification system comprising:
   at least one processor circuit with a memory comprising instructions, that when executed by the processor circuit, causing the processor circuit to at least:
   accept designation of attribute information from an occupant of a vehicle;
   extract related facilities having predetermined relations to replenishing places for replenishing driving energy of the vehicle;
   rank a plurality of replenishing places, if there are the plurality of replenishing places corresponding to a predetermined related facility, among the related facilities extracted, which is associated with the attribute information of the occupant obtained; and
   notify the occupant of a list of the plurality of replenishing places,
   wherein the at least one processor circuit is configured to perform first scoring on each of the plurality of replenishing places based on attribute information obtained from the predetermined related facility in advance, perform second scoring on each of the plurality of replenishing places based on a current position of the vehicle, and rank the plurality of replenishing places based on results of the first and second scoring, and
   the attribute information obtained from the predetermined related facility in advance includes average stay time, and the first scoring is performed based on the average stay time and time necessary to replenish driving energy of the vehicle.

10. A notification method to be executed in a notification system for notifying candidates of a replenishing place for replenishing driving energy of a vehicle, comprising:
- obtaining attribute information of an occupant of a vehicle;
- extracting related facilities having predetermined relations to replenishing places for replenishing driving energy of the vehicle;
- ranking a plurality of replenishing places, if there are the plurality of replenishing places corresponding to a predetermined related facility, among the related facilities extracted, which is associated with the attribute information of the occupant obtained; and
- notifying the occupant of a list of the plurality of replenishing places,
- wherein the step of ranking comprises performing first scoring on each of the plurality of replenishing places based on attribute information obtained from the predetermined related facility in advance, performing second scoring on each of the plurality of replenishing places based on a current position of the vehicle, and ranking the plurality of replenishing places based on results of the first and second scoring, and
- the attribute information obtained from the predetermined related facility in advance includes average stay time, and the first scoring is performed based on the average stay time and time necessary to replenish driving energy of the vehicle.

11. A notification method to be executed in a notification system for notifying candidates of a replenishing place for replenishing driving energy of a vehicle, comprising:
- accepting designation of attribute information from an occupant of a vehicle;
- extracting related facilities having predetermined relations to replenishing places for replenishing driving energy of the vehicle;
- ranking a plurality of replenishing places, if there are the plurality of replenishing places corresponding to a predetermined related facility, among the related facilities extracted, which is associated with the attribute information of the occupant obtained; and
- notifying the occupant of a list of the plurality of replenishing places,
- wherein the step of ranking comprises performing first scoring on each of the plurality of replenishing places based on attribute information obtained from the predetermined related facility in advance, performing second scoring on each of the plurality of replenishing places based on a current position of the vehicle, and ranking the plurality of replenishing places based on results of the first and second scoring, and
- the attribute information obtained from the predetermined related facility in advance includes average stay time, and the first scoring is performed based on the average stay time and time necessary to replenish driving energy of the vehicle.

12. A non-transitory computer-readable storage medium storing a program which causes a computer to function so as to:
- obtain attribute information of an occupant of a vehicle;
- extract related facilities having predetermined relations to replenishing places for replenishing driving energy of the vehicle;
- rank a plurality of replenishing places, if there are the plurality of replenishing places corresponding to a predetermined related facility, among the related facilities extracted, which is associated with the attribute information of the occupant obtained; and
- notify the occupant of a list of the plurality of replenishing places,
- wherein the computer is further caused to perform first scoring on each of the plurality of replenishing places based on attribute information obtained from the predetermined related facility in advance, perform second scoring on each of the plurality of replenishing places based on a current position of the vehicle, and rank the plurality of replenishing places based on results of the first and second scoring, and
- the attribute information obtained from the predetermined related facility in advance includes average stay time, and the first scoring is performed based on the average stay time and time necessary to replenish driving energy of the vehicle.

13. A non-transitory computer-readable storage medium storing a program which causes a computer to function so as to:
- accept designation of attribute information from an occupant of a vehicle;
- extract related facilities having predetermined relations to replenishing places for replenishing driving energy of the vehicle;
- rank a plurality of replenishing places, if there are the plurality of replenishing places corresponding to a predetermined related facility, among the related facilities extracted, which is associated with the attribute information of the occupant obtained; and
- notify the occupant of a list of the plurality of replenishing places,
- wherein the computer is further caused to perform first scoring on each of the plurality of replenishing places based on attribute information obtained from the predetermined related facility in advance, perform second scoring on each of the plurality of replenishing places based on a current position of the vehicle, and rank the plurality of replenishing places based on results of the first and second scoring, and
- the attribute information obtained from the predetermined related facility in advance includes average stay time, and the first scoring is performed based on the average stay time and time necessary to replenish driving energy of the vehicle.

* * * * *